Feb. 17, 1959    J. BISSEY    2,873,632
APPARATUS FOR BORING TUBULAR WORK
Filed Nov. 1, 1955    2 Sheets-Sheet 1

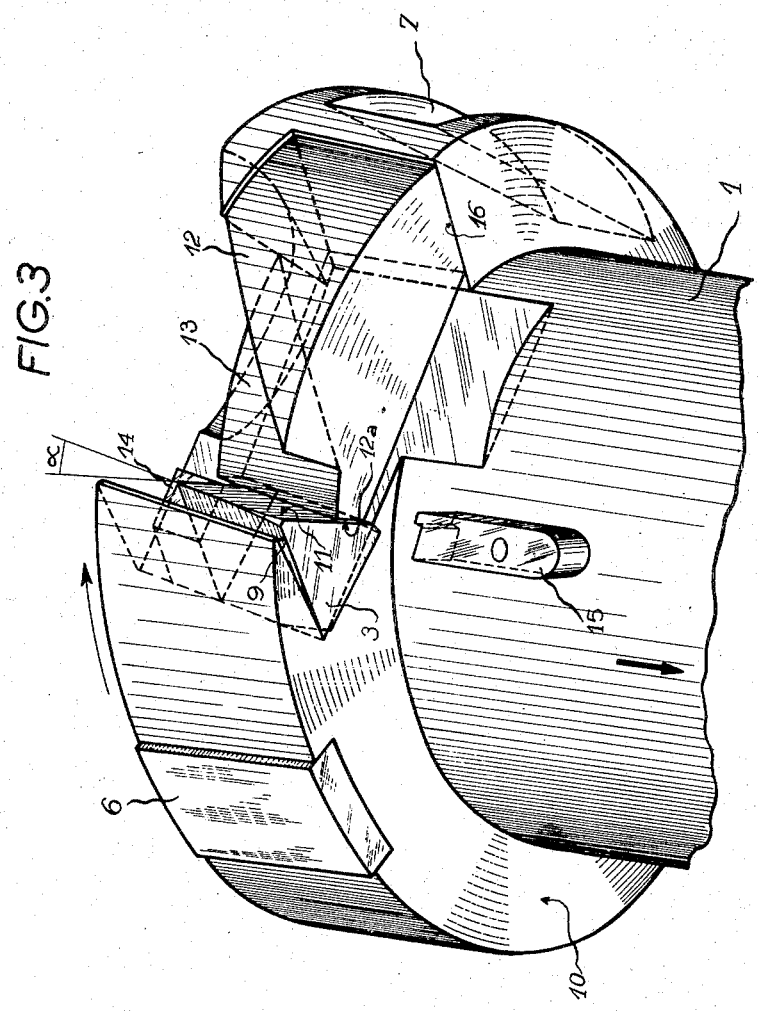

United States Patent Office 2,873,632
Patented Feb. 17, 1959

2,873,632

APPARATUS FOR BORING TUBULAR WORK

Jacques Bissey, Tarbes, France

Application November 1, 1955, Serial No. 544,323

Claims priority, application France November 17, 1954

6 Claims. (Cl. 77—58)

This invention relates to the boring of tubular parts, more especially to boring operations performed on tubular work of considerable size, e. g. cannon, hydraulic fluid actuator cylinders, ship's propeller shafts, and similar parts.

Heretofore the boring of such parts has been long and difficult. In some types of known boring apparatus, the borer head is propelled axially through the tubular work by a pulling force, transmitted through a draft member from a point in front of the head, while in others the borer head was forced through the work by a pushing force exerted from the rear. In either type of system the chips or borings were discharged in front of the borer head. Since the space available forward of the borer head gradually diminishes as the work progresses, the discharge of the cuttings becomes increasingly difficult to effect. It has generally been found necessary in order to assure an efficient discharge of the cuttings to provide means for breaking them up into finely divided particles as by imparting sharp changes of direction thereto. This frequently tends to set up vibrations which are troublesome and impair the quality of the finished product. In the above-mentioned "draft" type of boring apparatus, the presence of the draft member or force-transmitting bar extending through the tube and coupled to the borer head for drawing it through the latter greatly limits the available space for the discharge of chips and hence drastically restricts the rate at which the boring operation can be performed.

In conventional apparatus of the above specified pusher class this drawback is not present. However, in such apparatus there is a tendency for the bar transmitting the pushing force to the borer head, to buckle, with the result that the bore becomes arched rather than straight, and this arching increases as the rate of axial feed of the borer is increased. Moreover, buckling of the pusher bar sometimes tends to induce large-amplitude vibrations in the system, leading to a defective surface condition of the finished bore and sometimes resulting in tool breakage.

It is an object of this invention to provide improved apparatus for boring tubular work, which will be free of the above listed and other drawbacks commonly encountered heretofore. Other objects include the provision of such method and means which are particularly applicable for use in connection with tubular work of considerable length and size. Further objects are to obtain a perfectly formed bore in a large-size workpiece at an accurately predetermined bore diameter and with a high degree of rectilinearity; to produce such bores regardless of the length of the workpiece; and to attain these objects while at the same time increasing the speed of the boring operation.

Specific objects are to provide improved guiding and centering means for a boring head within a tubular workpiece, to provide such means which will be effective to guide the boring head along an accurately rectilinear path regardless of the length of the workpiece, and to provide such means which will automatically center the head. To form a truly concentric bore at an accurately predetermined diameter despite the wear which the tool is liable to sustain during the boring of a workpiece of great length.

In accordance with one aspect of my invention, I provide a boring head adapted to be drawn axially through the tubular workpiece by means of a draft bar extending through the workpiece forwardly of the boring head, which head is so constructed and arranged as to permit the borings to be continuously discharged towards the rear of the head in the form of long unbroken strips or ribbons.

The above and further objects, advantages and characteristics features of my invention will appear as the disclosure proceeds. An exemplary embodiment of my invention is illustrated in the accompanying drawings, given for purposes of explanation but not of limitation, and wherein:

Figure 3 is an isometric view taken from a different angle and on a larger scale than that of Figure 2, to illustrate details of the tool mounting arrangement.

Figure 1:
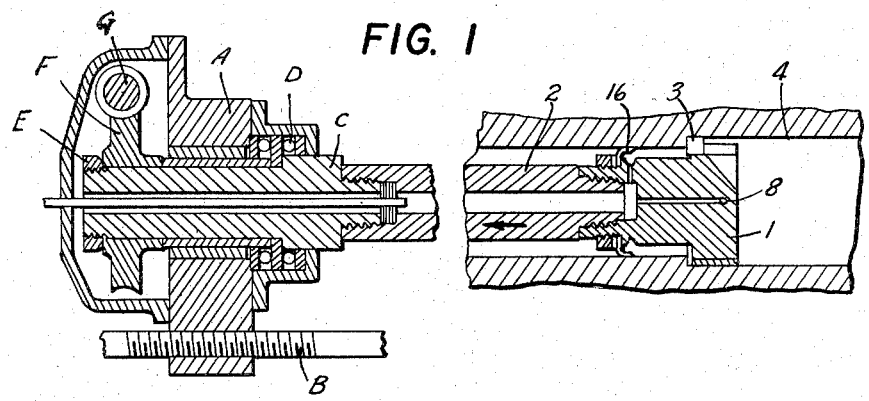
Figure 1 is a simplified diagrammatic view in axial longitudinal section, of an improved boring head assembly during a boring operation.

Referring first to the explanatory diagrammatic view of Figure 1, a boring head 1 is secured on one end of a draft bar 2 within a tubular workpiece 4, the outer end of the bar 2 being coupled to any suitable motive means, for drawing the bar and head assembly leftwards as shown in the drawing. At the same time as the boring head 1 is thus fed axially of the tube, relative rotation is imparted to the head with respect to the tube. It will be evident that such relative rotation can be obtained either by holding the work stationary and rotating the head 1 by means of the bar 2, or by maintaining the head 1 and bar 2 assembly in a fixed angular position and rotating the workpiece 4 relative thereto, or by imparting differential rotation to the boring assembly and the tube, in the same or in opposite directions. For example, as shown in Figure 1, A is a carriage moving along a threaded rod B and to which the tool-holding bar 2 is connected, said bar 2 being engaged with an axial mandrel C which is axially immobilized with respect to carriage A by a ball thrust bearing D on the one hand and by a screw nut E on the other. A helically toothed pinion F is mounted on the mandrel C and is rotatably driven by a tangent screw G which provides for the necessary rotation.

Figure 2:
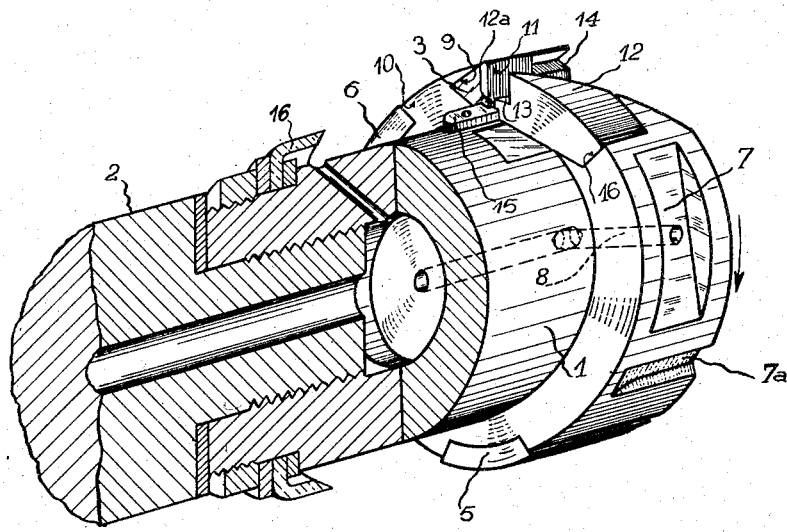
Figure 2 is an isometric perspective showing of a boring head, with the attachment of the head to the draft bar thereof illustrated in axial section.

As shown, the head 1 may be attached to the bar 2 by a threaded connection of an externally threaded axially projecting boss of the bar 2 engaging a complementarily internally threaded axial portion of the head 1, with an annular adjusting shim preferably interposed between the abutting end surfaces of both threaded portions, as shown in Figure 2.

The draft bar 2 is preferably formed with a diameter as large as consistent with the inner diameter of the bore initially provided in the blank workpiece through which said bar is to extend. To permit the delivery of coolant and pressure fluid in a manner to be later described into the working zone, the bar 2 is preferably provided tubular as shown and the fluid is delivered through the axial bore of said bar; however the draft bar 2 may be provided solid and the fluid delivered through the annular space between it and the surrounding workpiece blank.

The head 1 supports one or more cutting tools projecting radially from the head into cutting engagement with the inner surface of the tubular workpiece. Only a single tool 3 is illustrated in the exemplary embodiment described. The construction and mounting of the tool 3 will be described in detail presently.

According to my invention I provide improved means for guiding the boring head with respect to the bore so as to produce an accurately rectilinear bore irrespective of how long the workpiece may be and such means are moreover adapted to assure an accurately predetermined bore diameter despite the wear sustained by the cutting edge of the tool during a particular boring operation, within reasonable limits.

Essentially such guiding means may comprise one or more part-cylindrical surfaces of relatively narrow dimension axially of the tube, and located in trailing relationship with the tool during the relative rotation between it and the work. This cylindrical guide surface is arranged in operation to be firmly applied into tight engagement with the bore surface by pressure means adapted to exert a radial force against the bore surface, the point of application of said force being preferably located in diametrically opposed relationship with the circumferential midpoint of said cylindrical guide surface. In the exemplary embodiment illustrated hydraulic pressure means are provided utilizing coolant fluid delivered under pressure as further described.

The above mentioned cylindrical guide surface is herein provided by a pair of arcuate segmental members 5 and 6 made of tungsten carbide or other suitable wear-resisting material, suitably bonded, e. g. brazed, to the periphery of the boring head. One of these segmental members, the member 5, is secured at a point diametrically opposite the cutting edge of the tool 3, while the other member 6 is angularly located intermediate the member 5 and the cutting edge of the tool 3, in trailing relationship with the latter in terms of relative rotation between the head and the work. Instead of tungsten carbide the members 5 and 6 may be made of cast iron, bronze or other suitable alloys or carbide compositions. They may be attached to the head by any appropriate means, such as by screws, and they may be removably and/or adjustably mounted. Moreover, the guide members are not necessarily two in number as shown herein; indeed a single guide surface, which may extend all the way from a point adjacent the tool 3 to a point substantially diametrically opposed therefrom, may be provided. Instead of providing one or more separate guide members as herein shown, the actual cylindrical surface of the boring head 1, or partial areas thereof, may be used for a similar purpose.

Formed in the periphery of the boring head 1 is a milled cut-out or recess 7 so located that its midpoint as measured circumferentially of the boring head lies substantially on a line bisecting the external or larger one of the two angles defined between the two contact areas 5 and 6. Opening centrally into the cutout 7 is the radial outer section of a duct 8 which also comprises an axial inner section adapted to communicate with the inner bore formed in the draft bar 2 when the head 1 is secured to the bar 2. In operation, a suitable coolant fluid, which may be liquid or gaseous in character, e. g. oil, is delivered from a suitable pressure source into and through the draft bar 2 and thence through duct 8 into the cutout 7. The discharge pressure of the fluid is made sufficiently high to generate a high radial pressure field in the angular area defined by and around the cutout. This creates a strong resultant force which tends to shift the entire boring head assembly bodily in a lateral direction to apply the contact segments 5 and 6 firmly against the inner surface of the bore section of the tool 3, as will be apparent from Figure 1. The aforementioned lateral direction is perpendicular to the direction of movement of the draft bar 2 as shown by the arrow in Figure 1. An extremely efficient guiding action is thus obtained throughout the boring process and vibrations in the system are completely prevented.

It will be noted that the transverse force created as just described tends to shift the boring head in a direction to move the cutout 7 away from the bore surface in the workpiece, so that a gap of variable width is created between the boring head surface around cutout 7 and the adjacent area of the bore. As the wear sustained by the cutting edge of the tool increases during the boring process, this gap progressively increases and the cutting pressure is maintained substantially constant, so that owing to this wear-taking effect a uniform bore diameter is obtained even in the case of workpieces of considerable length.

The fluid discharged from duct 8 into recess 7 issues into the above mentioned gap created between the head 1 and the bore surface of the workpiece and is then discharged rearwardly of the boring head through channels such as 7a, preferably provided on either side of said recess.

Further features of my invention relating to the particular construction of the tool 3 and its mounting on the boring head will now be described.

In the illustrated embodiment the tool 3 is in the form of a straight triangular prism and is inserted into a suitable dove-tail recess 9 formed in the head in such a way that the arrises and axis of the prism are inclined at a predetermined angle $\alpha$ with respect to the axis of the boring head in a plane parallel thereto, so that the forward end of the tool juts out at a slight angle from the forward face 10 of the boring head. The angle $\alpha$ is so predetermined that the chips will be discharged rearwardly under a negative angle. Since the faces of the dihedral angle comprising the cutting edge are perpendicular, it will be noted that when it is necessary to sharpen the tool all that is required to do is to grind the end faces or bases of the prismatic tool.

The dovetail recess receiving the tool is, moreover, so formed that the cutting edge of the tool received therein is normal to and substantially in the same plane as the axis of the bore.

Means are provided for blocking the tool in its dovetail recess. These means comprise a wedging block 12 adapted to be pushed radially inwardly of the head between the outer face 11 of the tool and an opposing surface 16 formed in the head normally to the larger base of the dovetail recess 9 and lying at an appropriate angle, of e. g. 30°, to the face 11. Means, such as a radially directed set screw, a one way pressure device (not shown) are provided for blocking the wedging block 12 in place to exert the desired pressure on the tool in its recess. The under or radially inner face of the block 12 is spaced from the adjacent surface of the boring head so that adjustment of the set screw will cause the block to move relative to said head and thereby modify the pressure exerted on the tool in its dovetail lodging recess. Furthermore, the block 12 is formed with a cutout 13 in the face thereof directed towards the tool, so as to exert pressure only upon a radially inward area 12a of the tool. It should be noted that this pressure is exerted in the same direction as the tangential cutting reaction force.

In accordance with my invention, the cutout 13 is intended to provide an outlet for the chips rearwardly of the boring head, and for the same purpose the boring head itself is formed with a channel of gradually increasing cross sectional area in alignment with the cutout 13. This provides a rearwardly increasing outlet passage through which the chips are freely evacuated into the unobstructed bore formed in the workpiece behind the boring head as the latter advances, so that the cutting does not impede the advance of the boring head as it does in conventional tube boring machines operating on the draft principle, thereby permitting the use of much higher rates of axial feed.

The tool 3 is axially blocked in position by means of a presser block 14, mounted for axial adjustment relative to the head by means not shown, and adapted to take up the axial thrust developed upon the front cutting edge of the tool. Forwardly the tool 3 is blocked by a fixed abutment member 15 which serves to impart a fixed predetermined axial position to the cutting edge even though the length of the tool decreases with successive grinding operations. It is noted that the abutment 15 is shown displaced from its true position in Figure 3 for purposes of clarity.

In setting the improved boring head assembly for a particular bore diameter, the entire assembly including a tool mounted therein is mounted and blocked with the contact segments 5 and 6 in engagement with the surface of a bore of the desired diameter, and the longitudinal outer arris of the tool is then rectified so that it will be somewhat truncated and will constitute a smoothing and finishing tool for the bore surface. Then the tool may be withdrawn from its recess and reinserted successively with each of its longitudinal arrises directed outwardly, each time rectifying the outwardly directed longitudinal arris to the same outer diameter. If desired, each of the six edges thus obtained by truncation of the three arrises of the prismatic tool may be used in successive boring operations.

In order to maintain the requisite fluid-tightness in the working area and maintain a suitable pressure therein for the cooling fluid, means are provided for sealing the space defined in the tube forwardly of the boring head. For this purpose, a flexible seal may be secured to the tube at the forward end thereof for engagement with the outer surface of the bar 2. Alternatively as illustrated in Figures 1 and 2, a flexible seal assembly may be carried by the boring head or the bar attached thereto, including a flange 16 of flexible material such as leather, a suitable plastic etc. projecting into engagement with the inner surface of the bore.

It will be understood that various modifications may be made in the single exemplary construction illustrated herein without exceeding the scope of the invention as defined by the ensuing claims.

What I claim is:

1. In apparatus for boring a tubular workpiece, an elongated draft member, a boring head supported on the end of said member, means exerting a draft force on the member to draw the head axially, means imparting rotational movement to said member whereby to impart relative rotation between the member and workpiece, a tool supported on the head and having a cutting edge, said cutting edge being capable of projecting into cutting engagement with the workpiece to cut a bore therein and being located on the side of said head adjacent to said bar, and recessed means on said head defining a longitudinal passage of progressively increasing transverse sectional area from said cutting edge in a direction away from the draft member for discharge of cuttings in substantially unbroken ribbon form rearwardly of said boring head.

2. Apparatus as claimed in claim 1, wherein said tool is in the form of a right prism and is mounted on said head peripherally thereof with its axis forming a small angle to the axis of the head, and one side of the base of said prism directed towards said draft bar extending substantially radially of said head and providing said cutting edge.

3. Apparatus as claimed in claim 1, wherein said tool is in the form of a right prism and is mounted in said head peripherally theroef with its axis at a small angle to the axis of the head, one side of that base of the prism directed towards said draft bar extending generally radial of said head to provide said cutting edge for cutting said bore in the workpiece; and an outermost one of the longitudinal edges of said prism being truncated.

4. In apparatus for boring an axially recessed workpiece, an elongated draft member having an axis, a boring head supported on the end of said member, means exerting a draft force on the member for drawing said member, means imparting rotational movement to said member about said axis, a tool supported on the head and having a cutting edge, recessed means on said head defining a longitudinal passage from said cutting edge in a direction away from the draft member for discharge of cuttings produced by said cutting edge, guide surface means on the periphery of said head defining a part-cylindrical surface, a large recess in the lateral surface of said head in a general direction away from said guide surface, and means for discharging fluid under pressure into said recess to apply said guide surface means forcibly against said bore surface.

5. In apparatus for boring a recessed workpiece, a draft bar, a boring head supported on the end of said bar, means exerting a force on the bar whereby to draw the head, means imparting rotational movement to said member whereby to impart relative rotation between the member and workpiece, a tool supported on the head and having a cutting edge, said cutting edge being capable of projecting into cutting relationship with the workpiece to cut a bore therein, passage means formed on said head for discharging cuttings produced by said tool away from said head towards the side thereof remote from said bar, guide surface means on the periphery of said head defining a part-cylindrical surface, a large recess in the lateral surface of said head in a general direction away from said guide surface, and means for discharging coolant fluid under pressure into said recess to cool said tool and wash away said cuttings and simultaneously to apply said guide surface means forcibly against said bore surface whereby to maintain the cutting relationship between said tool and workpiece.

6. In apparatus as claimed in claim 5, axial duct means through said bar connected to a pressure source of said fluid at the outer end of said bar, and further duct means in said head connecting said first duct means to said recess.

References Cited in the file of this patent

UNITED STATES PATENTS

| 806,011 | Smart | Nov. 28, 1905 |
| 1,002,457 | Rowe | Sept. 5, 1911 |
| 1,304,981 | Hoagland | May 27, 1919 |
| 2,283,491 | Daley | May 19, 1942 |
| 2,283,497 | Fields et al. | May 19, 1942 |

FOREIGN PATENTS

| 127,681 | Great Britain | June 12, 1919 |
| 446,426 | France | Oct. 2, 1912 |